United States Patent
Ogata et al.

(10) Patent No.: US 10,540,024 B2
(45) Date of Patent: Jan. 21, 2020

(54) STYLUS

(71) Applicant: Wacom Co., Ltd., Saitama (JP)

(72) Inventors: Mamoru Ogata, Tokyo (JP); Kenichi Ninomiya, Kanagawa (JP); Kohei Tanaka, Tokyo (JP)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 15/927,648

(22) Filed: Mar. 21, 2018

(65) Prior Publication Data
US 2018/0299977 A1 Oct. 18, 2018

(30) Foreign Application Priority Data

Apr. 14, 2017 (JP) .................. 2017-080280

(51) Int. Cl.
| | |
|---|---|
| *G06F 3/0354* | (2013.01) |
| *B43K 29/00* | (2006.01) |
| *B43K 21/033* | (2006.01) |
| *B43K 29/02* | (2006.01) |
| *B43K 21/22* | (2006.01) |

(52) U.S. Cl.
CPC ........ *G06F 3/03545* (2013.01); *B43K 21/033* (2013.01); *B43K 29/004* (2013.01); *B43K 29/02* (2013.01); *B43K 21/22* (2013.01)

(58) Field of Classification Search
CPC combination set(s) only.
See application file for complete search history.

(56) References Cited

U.S. PATENT DOCUMENTS

| | | | |
|---|---|---|---|
| 5,633,471 A * | 5/1997 | Fukushima | ............... G01L 1/20 178/19.04 |
| 8,913,041 B2 | 12/2014 | Fukushima et al. | |
| 9,778,123 B2 | 10/2017 | Horie et al. | |
| 2015/0035807 A1* | 2/2015 | Ito | ........................ G06F 3/044 345/179 |
| 2018/0011560 A1 | 1/2018 | Kamiyama et al. | |

FOREIGN PATENT DOCUMENTS

| | | |
|---|---|---|
| JP | 2007-219723 A | 8/2007 |
| JP | 2011-186803 A | 9/2011 |
| JP | 2012-256088 A | 12/2012 |
| JP | 2013-161307 A | 8/2013 |
| WO | 2016/167264 A1 | 10/2016 |

* cited by examiner

*Primary Examiner* — Robin J Mishler
(74) *Attorney, Agent, or Firm* — Seed IP Law Group LLP

(57) ABSTRACT

A stylus includes in a tubular casing a core body, a pressure detector that detects a pressure applied to the core body, a coupling fitted over the core body, the coupling transmitting the pressure to the pressure detector, and a core pressing controller that controls the coupling to press the core body axially in the tubular casing. The coupling includes a push bearer that bears a push from the core pressing controller, a presser having an axial end fitted in the pressure detector, a fitting region fitted over a portion of the core body remote from a pen tip end of the tubular casing, a receptacle in which another end of the presser remote from an axial end thereof is axially movably housed, and an elastic member disposed in the receptacle, the elastic member biasing the other end of the presser resiliently toward an axial pen tip end of the receptacle.

14 Claims, 10 Drawing Sheets

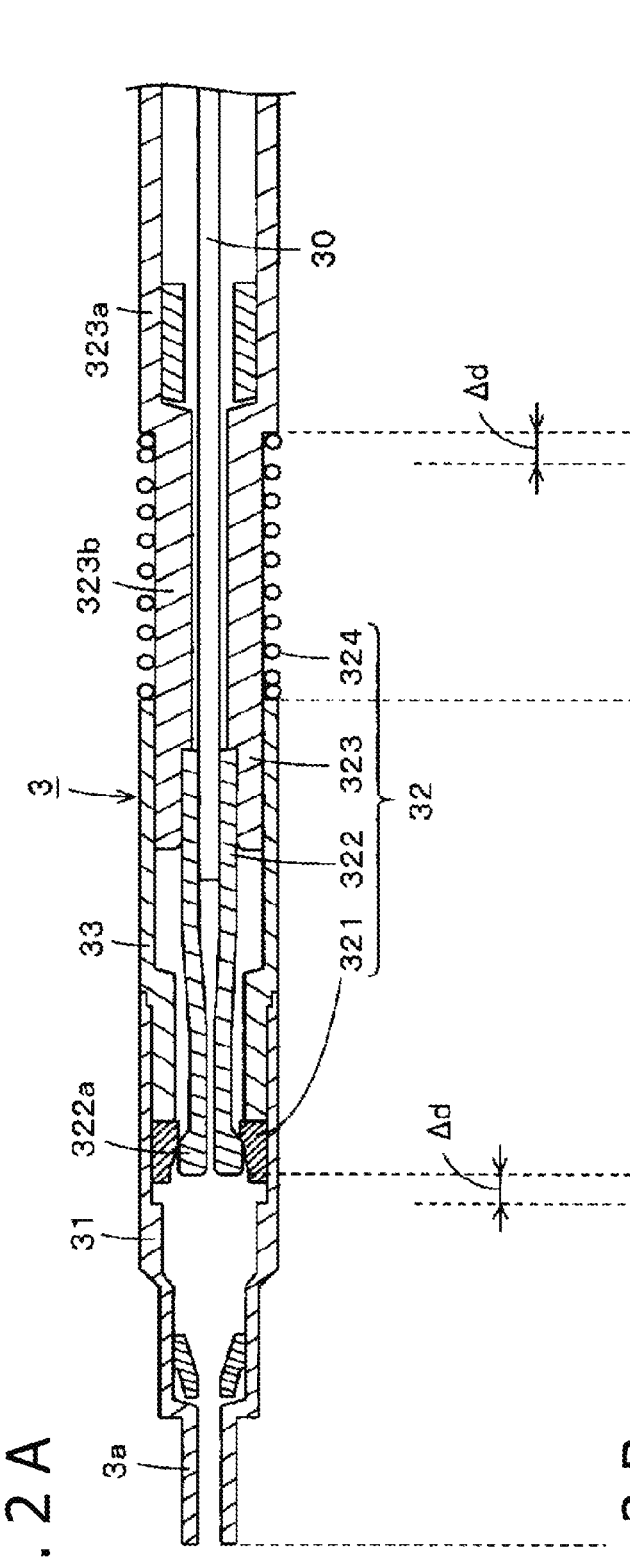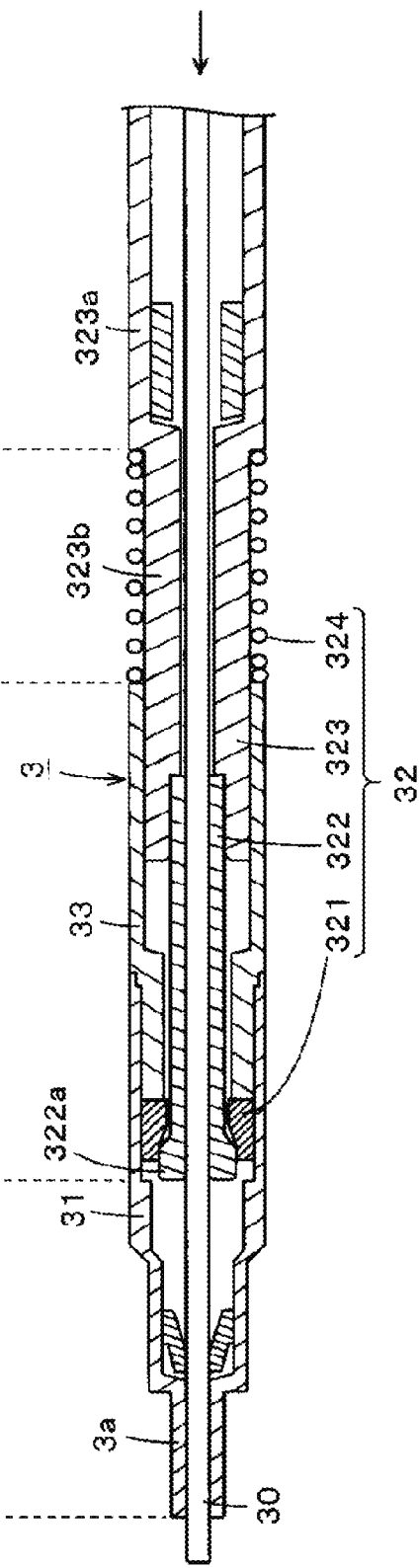

STYLUS

BACKGROUND

Technical Field

The present disclosure relates to a stylus that has a function to detect a pressure applied to a core body thereof.

Description of the Related Art

There has been known in the art an electronic pen that is used in combination with a position detecting device having a position detection sensor, as an example of a stylus that has a function to detect a pressure applied to a core body thereof. Specifically, the electronic pen has heretofore been arranged to have a function to detect a pressure (pen pressure) applied to the tip end (pen tip) of a core body thereof and transmit the detected pressure to a position detecting device.

Examples of pen pressure detectors for detecting a pen pressure include a pen pressure detector that uses a mechanism for changing the capacitance of a capacitor depending on a pen pressure (see, for example, Patent Document 1 (Japanese Patent Laid-open No. 2011-186803)) and a pen pressure detector in which a pressure-sensitive chip including a micro electro mechanical system (MEMS) device that changes the capacitance of a capacitor depending on a pressure applied thereto is accommodated as a packaged component (see, for example, Patent Document 2 (Japanese Patent Laid-open No. 2013-161307)).

In recent years, as disclosed in Patent Document 3 (Japanese Patent Laid-open No. 2007-219723) and Patent Document 4 (Japanese Patent Laid-open No. 2012-256088), a writing instrument functional member such as a ball-point pen refill or a mechanical pencil refill has been proposed as the core body of an electronic pen. Electronic pens of this type offer such advantages that when something is written by the ball-point pen or mechanical pencil as the electronic pen on a sheet of paper placed on the position detection sensor of a position detecting device that is used in combination with the electronic pen, the writing is left on the sheet of paper and is also recognized by the position detection sensor and left as electronic information.

There have also been proposed electronic pens of the type described which include a ball-point pen refill whose pen tip can be extended from one axial opening of a casing when the other end of the ball-point pen refill is pushed and a mechanical pencil refill whose writing core can be extended from the pen tip of the mechanical pencil refill when its other end is pushed. It is important in those electronic pens that the push on the refill should apply no pressure to a pen pressure detector that is provided in the electronic pen. Patent Document 5 (WO2016/167264) discloses an electronic pen whose writing core can be extended from the pen tip of a mechanical pencil refill when its other end is pushed, the electronic pen being constructed to prevent the push on the refill from applying pressure to the pen pressure detector.

FIGS. 12A through 12D of the accompanying drawings schematically depict the structure of the electronic pen disclosed in Patent Document 5. As depicted in FIGS. 12A through 12D, the electronic pen includes a tubular casing 101 and a mechanical pencil refill 102 housed in the casing 101 and having a pen tip 102a projecting from one axial opening 101a of the casing 101. The electronic pen also includes a pen pressure detector 103 housed in the casing 101 for detecting a pressure applied to the pen tip 102a of the mechanical pencil refill 102. A pen pressure transmitting member 104 for transmitting a pressure applied to the pen tip 102a of the mechanical pencil refill 102 to the pen pressure detector 103 is disposed between the mechanical pencil refill 102 and the pen pressure detector 103.

A knock member or push button 105 projects from an opposite opening 101b defined in the axially rear end (remote from the pen tip 102a) of the casing 101. When the knock member 105 is pushed, the mechanical pencil refill 102 is pressed in a direction toward the opening 101a, propelling a writing core 106 made of graphite or the like from the opening 101a. As depicted in FIGS. 12A through 12D, the knock member 105 engages the end of the mechanical pencil refill 102 that is opposite to the pen tip 102a such that a pressing force exerted by the knock member 105 when it is pushed is not applied to the pen pressure detector 103. Therefore, the pressing force exerted by the knock member 105 when it is pushed to propel the writing core 106 is not applied to the pen pressure detector 103.

The mechanical pencil refill 102 includes a core insertion tube 1021 and a core housing tube 1022 that are interconnected by a spring 1023. The core housing tube 1022 has a known core propelling mechanism, not depicted, disposed therein.

When the user of the electronic pen pushes the knock member 105 from the position depicted in FIG. 12A, the core housing tube 1022 is moved toward the core insertion tube 1021 against the resilient force of the spring 1023, causing the core propelling mechanism in the core housing tube 1022 to propel the writing core 106 until it projects out of the pen tip 102a of the mechanical pencil refill 102, which serves as the tip end of the core insertion tube 1021, as depicted in FIG. 12B.

When the push on the knock member 105 is removed, the knock member 105 is returned to the position depicted in FIG. 12A by a return mechanism, not depicted, combined with the knock member 105, as depicted in FIG. 12C. At this time, the core insertion tube 1021 and the core housing tube 1022 of the mechanical pencil refill 102 tend to return to their original positions under the resilient force of the spring 1023.

However, as well known in the art, the core propelling mechanism includes a chuck ring and a chuck disposed in the front end of the core housing tube 1022. Since the chuck operates to grip and propel the writing core 106, the core insertion tube 1021 and the core housing tube 1022 do not return to their original axially positional relation, but stay closer to each other against the resilient force of the spring 1023 by a distance corresponding to the projected length of the writing core 106, as depicted in FIG. 12C. Consequently, the axial length of the mechanical pencil refill 102 becomes shorter than when the writing core is not extended from the pen tip 102a as depicted in FIG. 12A.

At this time, a gap g is formed between the end of the mechanical pencil refill 102 remote from the pen tip 102a and the pen pressure transmitting member 104, as depicted in FIG. 12C. When the user is to start using the electronic pen by pressing the wiring core 106 from the pen tip 102a of the mechanical pencil refill 102 against a sheet of paper or the sensor input surface of a position detecting device, the pen tip 102a is pushed back into the casing 101, as depicted in FIG. 12D, making the user feel awkward about using the electronic pen.

The phenomenon that the pen tip 102a of the mechanical pencil refill 102 is pushed back into the casing 101 when the user is to start using the electronic pen happens not only on account of the propelling mechanism of the mechanical pencil refill 102, as described above. A gap is also formed between the end of the mechanical pencil refill 102 remote from the pen tip 102a and the pen pressure transmitting member 104 due to tolerances such as dimensional errors of the knock member 105 and the pen pressure transmitting member 104 and positional errors of the mechanical pencil refill 102, the pen pressure transmitting member 104, the pen pressure detector 103, and the knock member 105 in the casing 101, and the above phenomenon is likely to occur because of those dimensional errors and tolerances.

Therefore, in view of those dimensional errors and positional errors, in case not only the mechanical pencil refill 102, but also a ball-point pen refill or another component is used as a writing instrument functional member of an electronic pen, the same problems as those described above tend to happen if there are tolerances between a core body, a pen pressure detector, a pen pressure transmitting member, and a knock member.

BRIEF SUMMARY

It is therefore an object of the present disclosure to provide a stylus which will solve one or more of the above problems.

In accordance with the present disclosure, there is provided a stylus including: a tubular casing; a core body housed in the tubular casing; a pressure detector housed in the tubular casing, wherein the pressure detector, in operation, detects a pressure applied to the core body through an axial opening defined in the tubular casing; a coupling fitted over a portion of the core body remote from the axial opening, wherein the coupling, in operation, transmits the pressure to the pressure detector; and a core pressing controller which, in operation, controls the coupling to selectively press the portion of the core body remote from the axial opening into a pressed state in which the core body is displaced toward the axial opening and releases the core body from the pressed state in response to an external action, in which the coupling includes a push bearer which, in operation, bears a push from the core pressing controller, a presser having an axial end fitted in the pressure detector, a fitting region fitted over the portion of the core body remote from the axial opening, a receptacle in which another end of the presser remote from the axial end thereof is axially movably housed, and an elastic member disposed in the receptacle, the elastic member biasing the other end of the presser within the receptacle resiliently toward the axial opening defined in the tubular casing.

With the above arrangement, the portion of the core body is fitted in the coupling. The coupling includes the receptacle housing therein the axial other end of the presser whose axial one end is fitted in the pressure detector. In the receptacle, the axial other end of the presser is normally biased to move toward the axial opening defined in the tubular casing by the elastic member.

Therefore, even though the overall length of the core body, typically a mechanical pencil refill, is reduced when a writing core is propelled by a propelling mechanism in the core body, and even in the presence of tolerances, there is created no axial gap between the core body and the coupling, and a pressure transmitting member, preventing the core body from being pushed back into the tubular casing when a pressure is applied to the pen tip of the core body.

The above objects, features, and advantages of the present disclosure will become more apparent from the following description when taken in conjunction with the accompanying drawings.

BRIEF DESCRIPTION OF THE DRAWINGS

FIG. 2A is a longitudinal cross-sectional view depicting a propelling mechanism of the mechanical pencil refill;

FIG. 2B is a longitudinal cross-sectional view of the propelling mechanism with a writing core inserted therein;

DETAILED DESCRIPTION

First Embodiment

A stylus according to a first embodiment of the present disclosure will be described below with reference to FIGS. 1A through 9C.

Figure 1A:
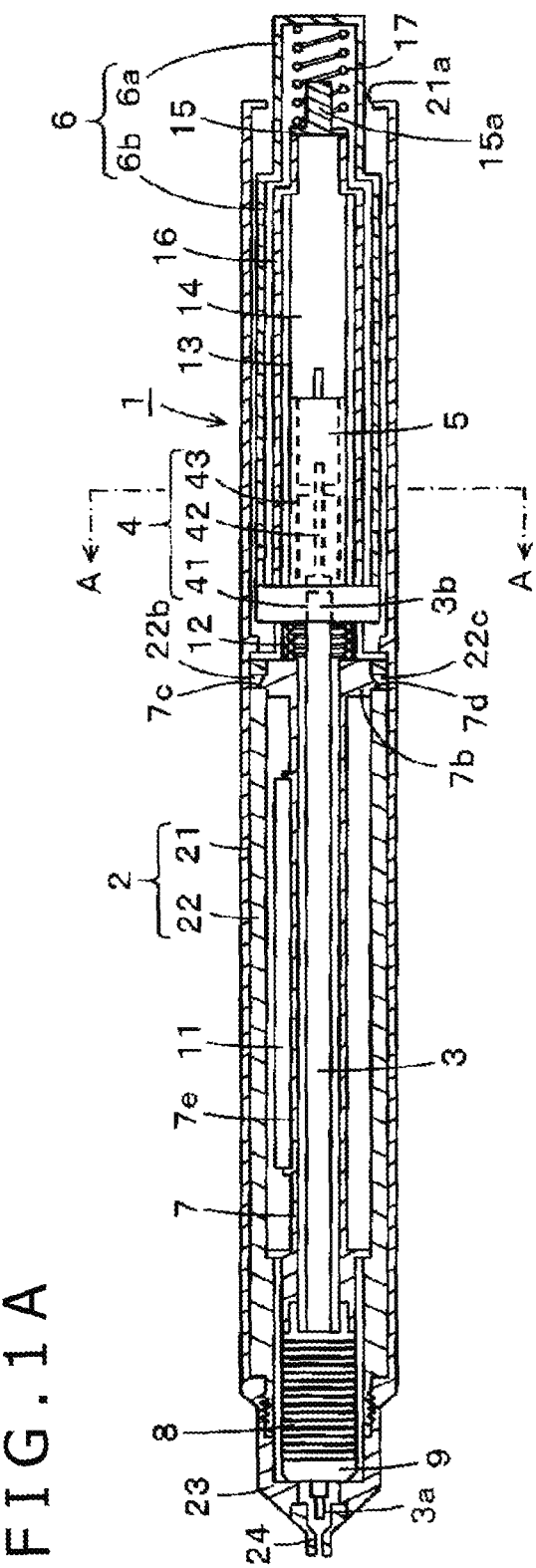
FIG. 1A is a longitudinal cross-sectional view of a stylus according to a first embodiment of the present disclosure.
Figure 1B:
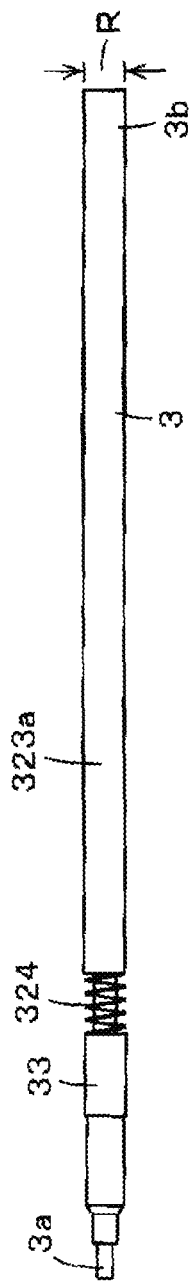
FIG. 1B is an elevational view of a mechanical pencil refill included in the stylus depicted in FIG. 1A.

FIG. 1A is a longitudinal cross-sectional view of a stylus according to the first embodiment, and FIG. 1B is an elevational view of a mechanical pencil refill 3 included in the stylus depicted in FIG. 1A. The stylus according to the first embodiment is in the form of an electronic pen 1 of the electromagnetic induction type. In FIG. 1A, the electronic pen 1 includes a pen-shaped tubular casing 2 and various components which are depicted in cross section to illustrate internal structural details.

As depicted in FIG. 1A, the electronic pen 1 has a mechanical pencil refill 3 serving as a core body, a coupling 4 in which a rear end 3b of the mechanical pencil refill 3 remote from a pen tip 3a thereof is fitted, a pressure detector (pen pressure detector) 5 that detects a pressure (pen pressure) applied to the pen tip 3a of the mechanical pencil refill 3, and a knock pusher 6 serving as a core pressing controller, which are all housed in the casing 2 and arranged successively axially in the casing 2. The end of the electronic pen 1 remote from its pen tip will hereinafter be referred to as "rear end."

FIG. 1B depicts the mechanical pencil refill 3 in elevation. FIGS. 2A and 2B depict a propelling mechanism for propelling a writing core 30 such as a graphite core, for example, of the mechanical pencil refill 3. Details of the propelling mechanism will be described later in detail.

Figure 3:
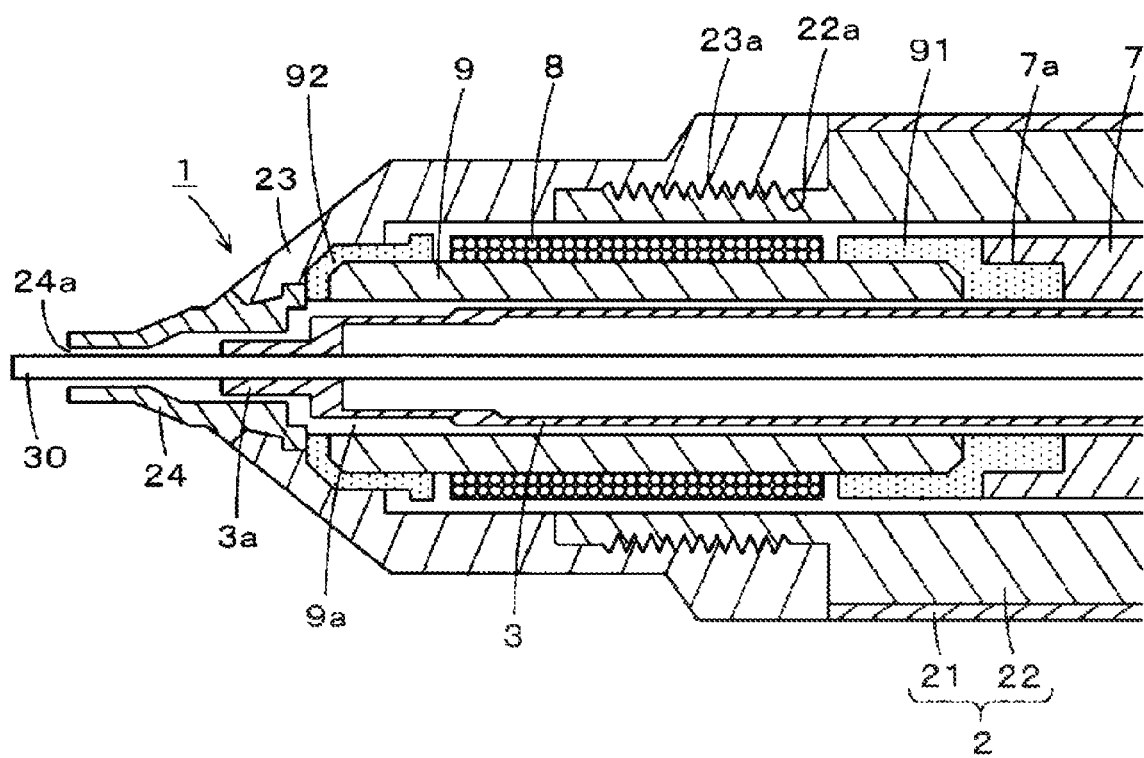
FIG. 3 is an enlarged fragmentary longitudinal cross-sectional view of a pen tip portion of the stylus.
Figure 4A:
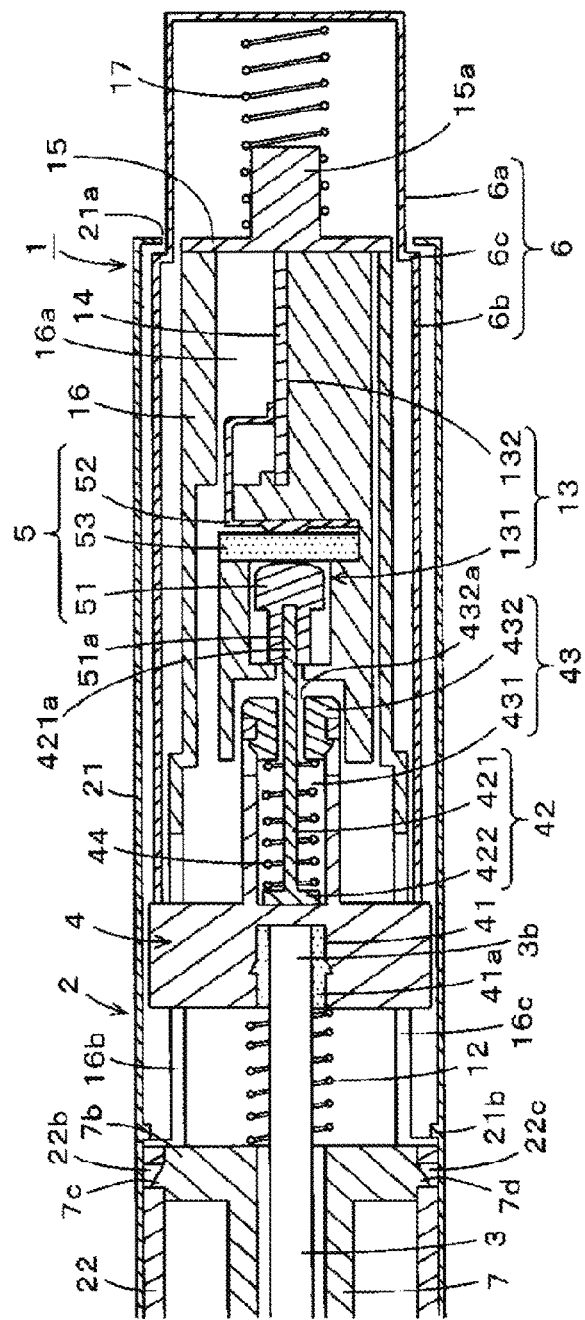
FIG. 4A is an enlarged fragmentary longitudinal cross-sectional view of a rear end portion of the stylus remote from the pen tip portion thereof, in which a protruding end of a knocking pusher is not pushed.
Figure 4B:
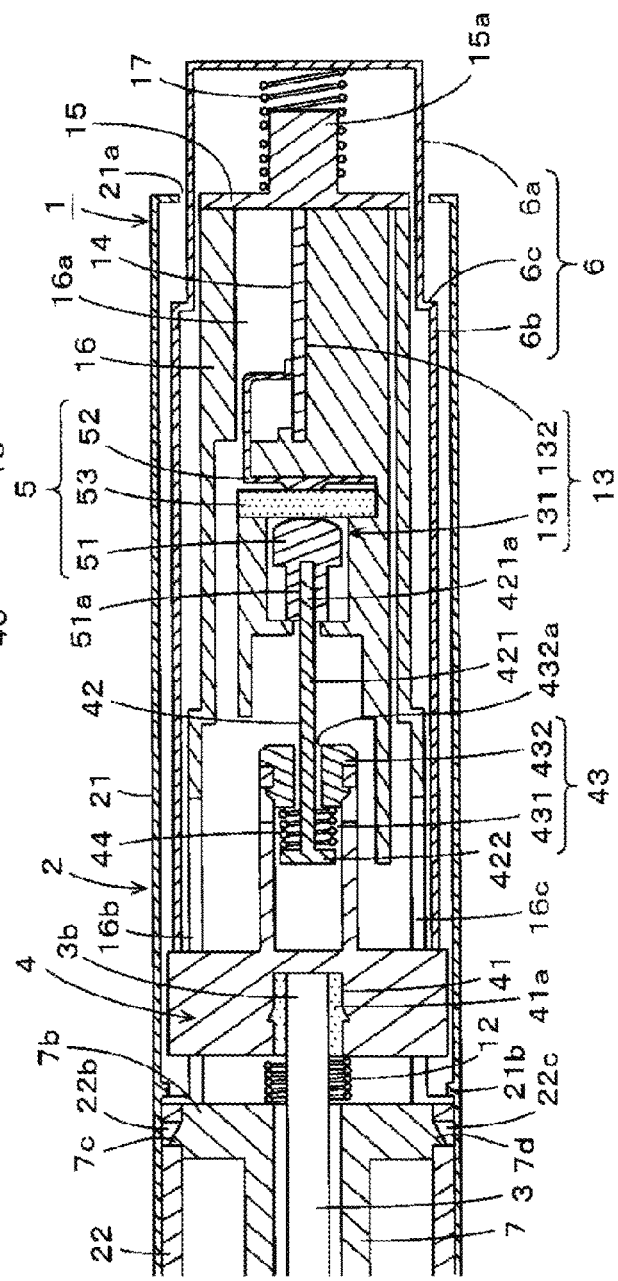
FIG. 4B is a view similar to FIG. 4A, except that the protruding end of the knocking pusher is pushed.

FIG. 3 is an enlarged fragmentary longitudinal cross-sectional view of a pen tip portion of the electronic pen 1. FIGS. 4A and 4B are enlarged fragmentary longitudinal cross-sectional views of a rear end portion of the electronic pen 1 remote from the pen tip portion thereof, i.e., behind a junction between the mechanical pencil refill 3 and the coupling 4. The cross section depicted in FIG. 1A and the cross sections depicted in FIGS. 4A and 4B are viewed in different directions. Specifically, FIG. 1A is viewed in a direction perpendicular to the plane of a printed-circuit board that is electrically connected to the terminals of the pen pressure detector 5, to be described later, and FIGS. 4A and 4B are viewed in a direction parallel to the plane of the printed-circuit board.

FIG. 4A depicts a state of the electronic pen 1 in which a knocking protrusion 6a of the knocking pusher 6 is not pushed, and FIG. 4B depicts a state of the electronic pen 1 in which the knocking protrusion 6a of the knocking pusher 6 is pushed for propelling the writing core 30.

As depicted in FIG. 1A, a pipe-shaped refill protection tube 7 made of an elastic material such as synthetic resin is disposed in the casing 2, and the mechanical pencil refill 3 is inserted in the refill protection tube 7 and has the pen tip 3a and the rear end 3b projecting out of the refill protection tube 7. The inside diameter of the refill protection tube 7 is larger than the diameter R (see FIG. 1B) of the mechanical pencil refill 3.

The casing 2 includes a tubular outer casing 21 depicted in FIGS. 1A, 3, 4A and 4B and a tubular inner casing 22 whose outside diameter is slightly smaller than the inside diameter of the tubular outer casing 21, the tubular inner casing 22 being fitted in the tubular outer casing 21. The tubular outer casing 21 has a length extending from the pen tip portion of the electronic pen 1 to the rear end portion thereof. The tubular inner casing 22 has a length extending from the pen tip portion of the electronic pen 1 to the rear end of the refill protection tube 7 so that the refill protection tube 7 is held in the space in the casing 2.

As depicted in FIGS. 1A and 3, one axial end of the casing 2 serves as the pen tip portion of the electronic pen 1. A pen tip sleeve 23 made of synthetic resin, for example, has an internally threaded surface 23a threaded over an externally threaded surface 22a of the tubular inner casing 22 on its pen tip portion.

A tip-end cap 24 made of metal is mounted in the distal end of the pen tip sleeve 23. The tip-end cap 24 has an opening 24a defined axially therethrough through which the writing core 30 propelled from the mechanical pencil refill 3 projects. The pen tip 3a of the mechanical pencil refill 3 is housed in the space in the tip-end cap 24, and does not project out of the tip-end cap 24.

A magnetic core with a coil 8 wound therearound, i.e., a ferrite core 9 in the first embodiment, is held on a pen tip end of the refill protection tube 7 near the pen tip 3a of the mechanical pencil refill 3. As depicted in FIG. 3, the ferrite core 9 has an axial through hole 9a defined therein, with the mechanical pencil refill 3 inserted in the axial through hole 9a. The pen tip 3a of the mechanical pencil refill 3 projects from the tip end of the ferrite core 9. The diameter of the axial through hole 9a is larger than the diameter R (see FIG. 1B) of the mechanical pencil refill 3. In the first embodiment, the diameter of the axial through hole 9a is equal to the inside diameter of the refill protection tube 7.

As depicted in FIG. 3, an elastic member 91 made of an elastomeric rubber material, for example, is placed over a rear end portion of the ferrite core 9. The elastic member 91 has a through hole defined therein which connects to the through hole 9a in the ferrite core 9. The refill protection tube 7 has a recess 7a defined in its pen tip end, and the elastic member 91 has a rear end portion fitted in the recess 7a, thereby joining the rear end portion of the ferrite core 9 to the pen tip end of the refill protection tube 7 through the elastic member 91.

As depicted in FIGS. 1A, 4A, and 4B, the refill protection tube 7 has a flange 7b on its rear end which has teeth 7c and 7d on an outer circumferential surface thereof that engage in respective engagement openings 22b and 22c defined in a rear end portion of the tubular inner casing 22.

The refill protection tube 7, the pen tip sleeve 23, and the casing 2 are put together as follows: First, the refill protection tube 7 with the ferrite core 9 joined thereto is inserted into the tubular inner casing 22 from an opening defined in its pen tip end such that the ferrite core 9 will be positioned in the pen tip of the electronic pen 1. As depicted in FIGS. 1A, 4A, and 4B, the refill protection tube 7 is pushed into the tubular inner casing 22 until the teeth 7c and 7d snap into the respective engagement openings 22b and 22c defined in the tubular inner casing 22. The refill protection tube 7 is now locked in the tubular inner casing 22. Thereafter, as depicted in FIG. 3, the pen tip sleeve 23 provided with the tip-end cap 24 is threaded over the pen tip portion of the tubular inner casing 22.

As depicted in FIG. 3, the tip end portion of the ferrite core 9 is covered with an elastic member 92 made of an elastomeric rubber material, for example, and having a through hole which connects to the through hole 9a in the ferrite core 9. The tip end portion of the ferrite core 9 abuts against axial inner walls of the pen tip sleeve 23 and the tip-end cap 24 through the elastic member 92. The elastic member 92 has a function to protect the tip end portion of the slender ferrite core 9 that has the through hole 9a against damage and also has a function to lock the refill protection tube 7 against axial movement with respect to the tubular inner casing 22. The elastic member 91 on the rear end portion of the ferrite core 9 also has the same functions as those of the elastic member 92.

According to the first embodiment, as depicted in FIG. 1A, the refill protection tube 7 includes a flat printed-circuit board mount 7e formed on an axially intermediate portion of an outer circumferential surface thereof. A printed-circuit board 11 having an elongate shape is placed on the flat printed-circuit board mount 7e. The printed-circuit board 11 includes a capacitor, not depicted, that cooperates with the coil 8 on the ferrite core 9 in making up a resonant circuit. The coil 8 has both of its ends soldered to the printed-circuit board 11 to complete the resonant circuit.

The mechanical pencil refill 3 is introduced into the casing 2 as follows: The mechanical pencil refill 3 is inserted into the refill protection tube 7 locked in the tubular inner casing 22 such that the pen tip 3a of the mechanical pencil refill 3 projects forwardly from the tip end of the ferrite core 9, as depicted in FIGS. 1A and 3, and the rear end 3b of the mechanical pencil refill 3 projects rearwardly from the flange 7b on the rear end of the refill protection tube 7, as depicted in FIGS. 1A, 4A, and 4B.

The projecting rear end 3b of the mechanical pencil refill 3 is fitted in a recess 41 defined in the coupling 4, as depicted in FIGS. 4A and 4B. The recess 41 serves as a fitting region where the coupling 4 fits over the rear end 3b of the mechanical pencil refill 3. An elastic member 41a made of an elastomeric rubber material, for example, is fixedly inserted in the recess 41, and the rear end 3b of the mechanical pencil refill 3 is press-fitted in the elastic member 41a in the recess 41.

An elastic member, i.e., a helical spring 12 in the first embodiment, is provided between the coupling 4 and the rear end of the refill protection tube 7. The coupling 4 is normally biased by the helical spring 12 to move rearwardly away from the refill protection tube 7 locked in the tubular inner casing 22.

The coupling 4 has a function to transmit a pressure (pen pressure) applied to the pen tip 3a of the mechanical pencil refill 3 whose rear end 3b is fitted in the recess 41, to the pen pressure detector 5, and also to push the mechanical pencil refill 3 forwardly toward the tip-end cap 24 in order to operate the propelling mechanism for propelling the mechanical pencil refill 3 when a knocking pusher, to be described later, is pushed. The helical spring 12 serves to return the coupling 4 which has been pushed forwardly by the knocking pusher back to its original position when the push on the knocking pusher is removed.

Figure 5:
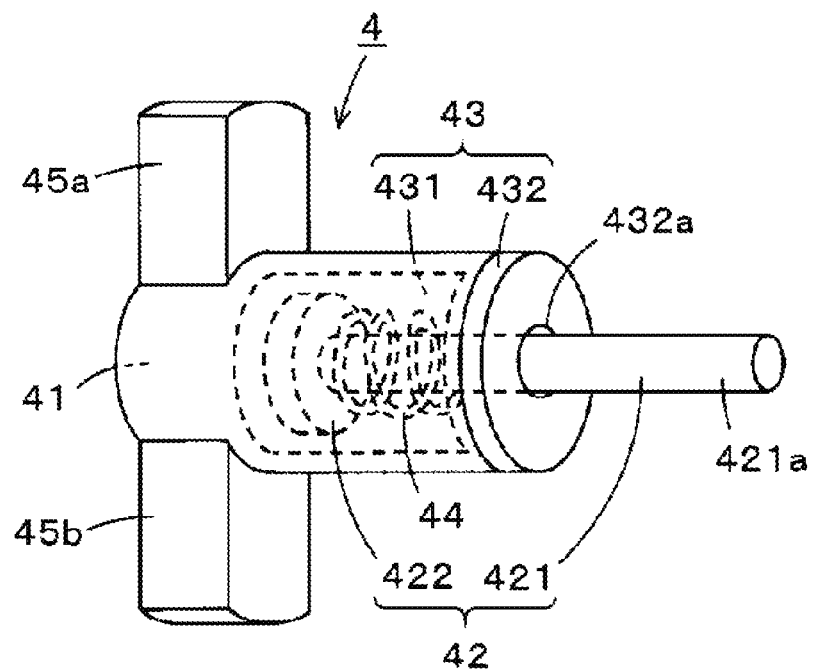
FIG. 5 is a perspective view of a coupling in the stylus depicted in FIG. 1A.

FIG. 5 depicts the coupling 4 in perspective. As depicted in FIGS. 1A, 4A, 4B, and 5, the coupling 4 includes, as structural details for performing the function to transmit a pressure applied to the pen tip 3a of the mechanical pencil refill 3 to the pen pressure detector 5, a presser 42 engaging an axial end of the pen pressure detector 5 and including a rod 421, and a receptacle 43 housing the presser 42 therein such that a rear end portion 421a of the rod 421 is fitted in the pen pressure detector 5.

As depicted in FIGS. 4A, 4B, and 5, the receptacle 43 has a hollow cylindrical storage space 431 whose opening is closed by a lid 432. The lid 432 has a through hole 432a defined centrally therein through which the rear end portion 421a of the rod 421 projects toward the pen pressure detector 5.

The presser 42 is an independent component made of a hard synthetic resin material, for example. As depicted in FIGS. 4A, 4B, and 5, the presser 42 includes a disk-shaped plate 422 shaped complementarily to the cross-sectional shape of the hollow cylindrical storage space 431 and the rod 421 that is integral with the disk-shaped plate 422 and extends perpendicularly therefrom at a central position thereof. The presser 42 is inserted in the hollow cylindrical storage space 431 such that the disk-shaped plate 422 is located closer to the pen tip of the electronic pen 1.

An elastic member, i.e., a helical spring 44 in the first embodiment, is disposed between the disk-shaped plate 422 and the lid 432 for normally biasing the presser 42 toward the bottom (pen tip side) of the hollow cylindrical storage space 431. The helical spring 44, which has a diameter smaller than the diameter of the disk-shaped plate 422 and larger than the diameter of the rod 421, is wound around the rod 421.

The lid 432 is mounted on the receptacle 43 in closing relation to the hollow cylindrical storage space 431, with the rod 421 extending through the through hole 432a and including the rear end portion 421a positioned out of the receptacle 43, and also with the disk-shaped plate 422 being normally biased toward the pen tip by the helical spring 44.

As depicted in FIGS. 4A and 4B, the pen pressure detector 5 is held on a holder 13. The holder 13 also holds thereon a printed-circuit board 14 that is electrically connected to the terminals of the pen pressure detector 5. According to the first embodiment, the pen pressure detector 5 detects a pen pressure by detecting a change in the capacitance of a capacitor. The capacitor includes an electrically conductive elastic member 51, a metal terminal member 52, and a dielectric member 53 provided between the elastic member 51 and the metal terminal member 52.

The elastic member 51 is shell-shaped with its tip end having a curved surface held against the dielectric member 53. The elastic member 51 has a fitting portion 51a axially remote from the shell-shaped curved surface. The rear end portion 421a of the rod 421 is fitted in the fitting portion 51a.

The pen pressure detector 5 operates as follows: Since the rear end 3b of the mechanical pencil refill 3 is fitted in the recess 41 in the coupling 4, when a pressure (pen pressure) is applied to the pen tip 3a of the mechanical pencil refill 3, the applied pressure is transmitted through the presser 42 of the coupling 4 to the elastic member 51 of the pen pressure detector 5. The shell-shaped curved surface of the elastic member 51 is then pressed against the dielectric member 53, changing the area of contact between the elastic member 51 and the dielectric member 53 under the applied pressure thereby to change the capacitance of the capacitor made up of the elastic member 51, the metal terminal member 52, and the dielectric member 53. Therefore, the pen pressure detector 5 can detect the applied pressure from the change in the capacitance. The electronic pen 1 according to the first embodiments transmits information of the pen pressure as a change in the resonant frequency of the resonant circuit to a position detecting device.

The holder 13 includes a holding section 131 which houses therein the elastic member 51, the dielectric member 53, and the metal terminal member 52 that are arranged successively in the order named from the pen tip of the electronic pen 1. The holder 13 also includes a printed-circuit board mount 132 on which the printed-circuit board 14 is placed. The elastic member 51 and the metal terminal member 52, which serve as two electrodes of the capacitor held by the holding section 131, are electrically connected to the printed-circuit board 14.

Although not depicted, the printed-circuit board 14 and the printed-circuit board 11 are electrically connected to each other, connecting the capacitor provided by the pen pressure detector 5 parallel to the resonant circuit made up of the coil 8 and the capacitor of the printed-circuit board 11.

A rear end closure lid 15 is joined to the end face of the rear end of the holder 13. The holder 13 is housed in a storage space 16a defined in a hollow cylindrical holder storage body 16 disposed in the tubular outer casing 21 of the casing 2. The rear end closure lid 15 has a peripheral edge joined to the rear end face of the holder storage body 16. The holder storage body 16 with the storage space 16a defined therein and the holder 13 holding the pen pressure detector 5 and the printed-circuit board 14 therein and fixedly housed in the storage space 16a thus jointly make up a unit.

The rear end portion 421a of the rod 421 of the presser 42 is fitted in the fitting portion 51a of the elastic member 51, thereby joining the coupling 4 to the holder 13 that is housed in the holder storage body 16.

As depicted in FIGS. 1A, 1B, 4A, and 4B, the axial length of the holder storage body 16 extends from the rear end of the tubular outer casing 21 to the end face of the flange 7b of the refill protection tube 7 and the rear end face of the tubular inner casing 22. As depicted in FIGS. 4A and 4B, the end of the holder storage body 16 that is closer to the pen tip is gripped between a ledge 21b on an inner wall surface of the tubular outer casing 21, and the end face of the flange 7b of the refill protection tube 7 and the rear end face of the tubular inner casing 22, so that the holder storage body 16 is fixedly positioned in the casing 2 against axial movement therein.

Figure 6:
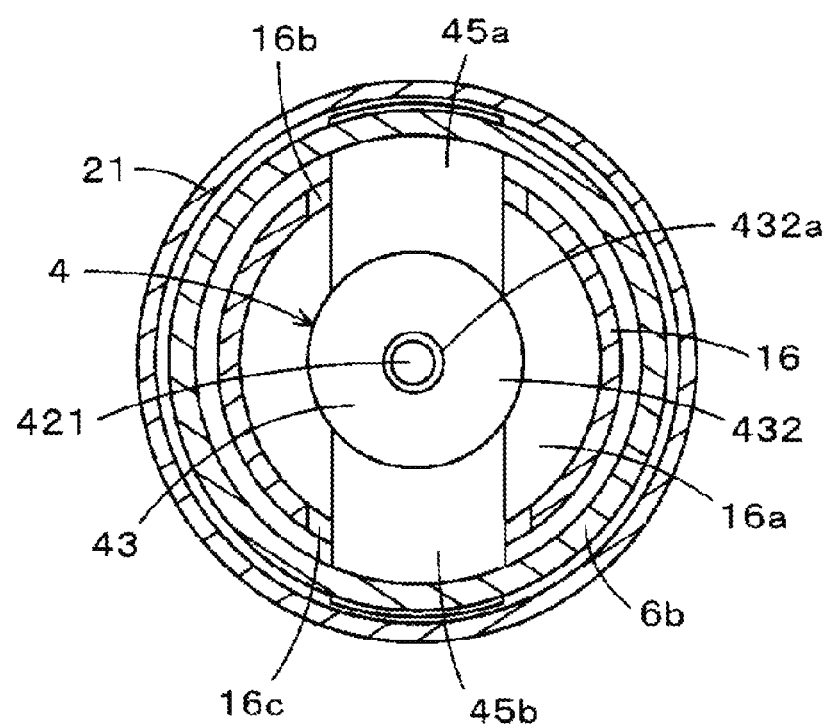
FIG. 6 is a cross-sectional view taken along line A-A of FIG. 1A.

FIG. 6 is a cross-sectional view taken along line A-A of FIG. 1A at a position between the coupling 4 and the pen pressure detector 5. As depicted in FIGS. 5 and 6, the coupling 4 has a pair of diametrically opposite push bearers 45a and 45b projecting perpendicularly to its central axis from the portion thereof where the recess 41 that receives the rear end 3b of the mechanical pencil refill 3 is defined. The push bearers 45a and 45b project radially outwardly beyond the holder storage body 16 so as to be able to bear the push from a coupling pushing member 6b of the knocking pusher 6 as the core pressing controller.

As depicted in FIGS. 4A, 4B, and 6, the holder storage body 16 has a pair of diametrically opposite slots 16b and 16c defined therein around the respective push bearers 45a and 45b. The push bearers 45a and 45b project radially outwardly from the holder storage body 16 through the respective slots 16b and 16c.

The knocking pusher 6 is disposed outside of the holder storage body 16 in covering relation thereto. The knocking pusher 6 includes the knocking protrusion 6a and the coupling pushing member 6b. The knocking protrusion 6a projects rearwardly through an opening 21a defined in the rear end of the tubular outer casing 21. The coupling pushing member 6b is of a tubular shape housing therein the holder storage body 16 within the tubular outer casing 21 and has an end closer to the pen tip which is held in abutment against the push bearers 45a and 45b.

For operating at least the propelling mechanism for propelling the mechanical pencil refill 3, the knocking pusher 6 is axially movable freely without being obstructed by the holder storage body 16. In other words, when the knocking pusher 6 is knocked or pushed in, it is axially slidable without imparting any force at all from the push to the pen pressure detector 5 held by the holder 13 that is housed in the holder storage body 16.

As depicted in FIGS. 4A and 4B, the knocking protrusion 6a and the coupling pushing member 6b of the knocking pusher 6 are interconnected by a step 6c. When the knocking pusher 6 is not knocked or pushed in, the step 6c engages the edge of the tubular outer casing 21 around the opening 21a, preventing the coupling pushing member 6b from jumping out of the casing 2 while allowing only the knocking protrusion 6a to project from the opening 21a.

The knocking protrusion 6a is of a hollow structure housing therein a helical return spring 17 acting between the outer end of the knocking protrusion 6a and the rear end closure lid 15 on the rear end of the holder storage body 16. The helical return spring 17 normally biases the knocking protrusion 6a to move away from the rear end closure lid 15. The helical return spring 17 has a portion fitted over a boss 15a projecting centrally from the surface of the rear end closure lid 15 which faces the knocking protrusion 6a, so that the helical return spring 17 is securely positioned on the rear end closure lid 15 within the knocking protrusion 6a.

For assembling the electronic pen 1, the holder 13 that holds the pen pressure detector 5 and the printed-circuit board 14 therein is housed in the holder storage body 16 and joined thereto by the rear end closure lid 15, thereby making up the unit, and the rear end portion 421a of the rod 421 of the presser 42 is fitted in the fitting portion 51a of the elastic member 51, thereby joining the coupling 4 to the holder 13 and the holder storage body 16. Thereafter, the knocking pusher 6 is placed over the unit from the rear end closure lid 15. The unit and the knocking pusher 6 are housed in the tubular outer casing 21, which is then fitted over the tubular inner casing 22.

As described above, the end face of the holder storage body 16 that is closer to the pen tip is held against the rear end face of the tubular inner casing 22 and the end face of the flange 7b of the refill protection tube 7, and the end of the holder storage body 16 that is closer to the pen tip is gripped between the end face of the flange 7b of the refill protection tube 7 and the rear end face of the tubular inner casing 22, and the ledge 21b of the tubular outer casing 21, so that the holder storage body 16 is locked in the casing 2.

Then, the mechanical pencil refill 3 is inserted, with its rear end 3b foremost, into the axial through hole 9a in the ferrite core 9 and pushed axially through the ferrite core 9 and the refill protection tube 7 until the rear end 3b is fitted in the recess 41 in the coupling 4. Therefore, the electronic pen 1 is of such a structure that the mechanical pencil refill 3 replaceable.

After the mechanical pencil refill 3 has been installed in place, the pen tip sleeve 23 is threaded over the tubular inner casing 22. The electronic pen 1 according to the first embodiment is now completed. When the knocking protrusion 6a of the knocking pusher 6 is pushed by the user of the electronic pen 1, as depicted in FIG. 4B, the coupling 4 is axially slidingly moved by the coupling pushing member 6b of the knocking pusher 6. The push from the knocking pusher 6 is axially transmitted to the mechanical pencil refill 3 whose rear end 3b is fitted in the coupling 4, operating the propelling mechanism to project the writing core 30 from the pen tip 3a.

[Propelling Mechanism for Propelling the Writing Core 30 of the Mechanical Pencil Refill 3]

The propelling mechanism that propels the writing core 30 of the mechanical pencil refill 3 will be described below with reference to FIGS. 2A and 2B. In FIG. 2A, the writing core 30 is illustrated as being not propelled. In FIG. 2B, the writing core 30 is illustrated as being propelled.

As depicted in FIGS. 2A and 2B, the mechanical pencil refill 3 includes a propelling mechanism 32 that propels the writing core 30, e.g., a graphite core or the like, through an opening defined in a pen tip 3a of the distal end of a core insertion tube 31. The core insertion tube 31 has a rear end portion fitted over a front end portion of a core housing tube 33. The propelling mechanism 32 includes a chuck ring 321 on the front end of the core housing tube 33, a chuck 322 extending rearwardly from the chuck ring 321, a slide tube 323 slidably disposed in the core housing tube 33 and fitted over a rear end portion of the chuck 322, and a helical spring 324 coiled around the slide tube 323.

The slide tube 323 includes a large-diameter portion 323a whose outside diameter is equal to the outside diameter of the core housing tube 33, and a small-diameter portion 323b whose outside diameter is slightly smaller than the diameter of a space in the core housing tube 33. The small-diameter portion 323b of the slide tube 323 has a portion slidably inserted in the core housing tube 33. The rear end portion of the chuck 322 is fitted in a front end portion of the small-diameter portion 323b of the slide tube 323.

The helical spring 324 is disposed around a portion of the small-diameter portion 323b of the slide tube 323 which is not inserted in the core housing tube 33. The helical spring 324 normally biases the slide tube 323 and the chuck 322 to move away from the pen tip 3a with respect to the core insertion tube 31 and the core housing tube 33.

The chuck 322, which serves to grip the writing core 30 such as a graphite core or the like, has an end portion 322a closer to the pen tip 3a that is a large-diameter portion whose outside diameter is larger than the outside diameter of the other portion of the chuck 322. As depicted in FIGS. 2A and 2B, the end portion 322a engages the chuck ring 321 on the front end of the core housing tube 33 to lock the slide tube 323 and the chuck 322 in a position depicted in FIG. 2A or a position depicted in FIG. 2B regardless of the elastic displacing force from the helical spring 324.

The large-diameter portion 323a of the slide tube 323 extends to an end remote from the pen tip 3a of the mechanical pencil refill 3, which end serves as the rear end 3b of the mechanical pencil refill 3.

When the user knocks or pushes in the knocking pusher 6, applying a pushing force toward the pen tip 3a, the pushing force is transmitted through the coupling 4 to the slide tube 323. The slide tube 323 slides toward the pen tip 3a with respect to the core insertion tube 31 and the core housing tube 33, causing the chuck 322 to propel the writing core 30 through the slide tube 323 toward the pen tip 3a by the distance that the slide tube 323 slides.

The outside diameter of the end portion 322a of the chuck 322 at the time it does not grip the writing core 30 as depicted in FIG. 2A is different from the outside diameter of the end portion 322a of the chuck 322 at the time it grips the writing core 30 as depicted in FIG. 2B by the thickness of the writing core 30. Consequently, the position where the end portion 322a of the chuck 322 engages the chuck ring 321 at the time it does not grip the writing core 30 as depicted in FIG. 2A is different from the position where the end portion 322a of the chuck 322 engages the chuck ring 321 at the time it grips the writing core 30 as depicted in FIG. 2B by an axial distance Δd. At the time the end portion 322a of the chuck 322 grips the writing core 30 as depicted in FIG. 2B, therefore, the slide tube 323 is closer to the core housing tube 33 by the axial distance Δd, making the mechanical pencil refill 3 shorter in its entirety by the axial distance Δd.

According to the first embodiment, even though the length of the mechanical pencil refill 3 at the time the writing core 30 is propelled is different from the length of the mechanical pencil refill 3 at the time the writing core 30 is not propelled, the difference is not felt by the user on account of the operation of the coupling 4 at the time the knocking pusher 6 is knocked, as described later.

According to the first embodiment, as described above, the pushing force applied to the knocking pusher 6 for propelling the writing core 30 is not applied to the pen pressure detector 5, but is transmitted through the coupling 4 to the rear end 3b of the mechanical pencil refill 3.

Therefore, only the pen pressure from the pen tip 3a of the mechanical pencil refill 3 is applied to the pen pressure detector 5, but the pressure applied to the propelling mechanism by the push on the knocking protrusion 6a of the knocking pusher 6, which is remote from the pen tip 3a, is not applied to the pen pressure detector 5. Consequently, deterioration of the pen pressure detector 5 can be reduced.

[Circuit Arrangement of a Position Detecting Device Used in Combination with the Electronic Pen 1 for Positional Detection and Pen Pressure Detection]

A circuit arrangement and operation of a position detecting device 500 for detecting a position indicated by the electronic pen 1 according to the first embodiment and also detecting a pen pressure applied to the electronic pen 1 will be described below with reference to FIG. 7.

Figure 7:
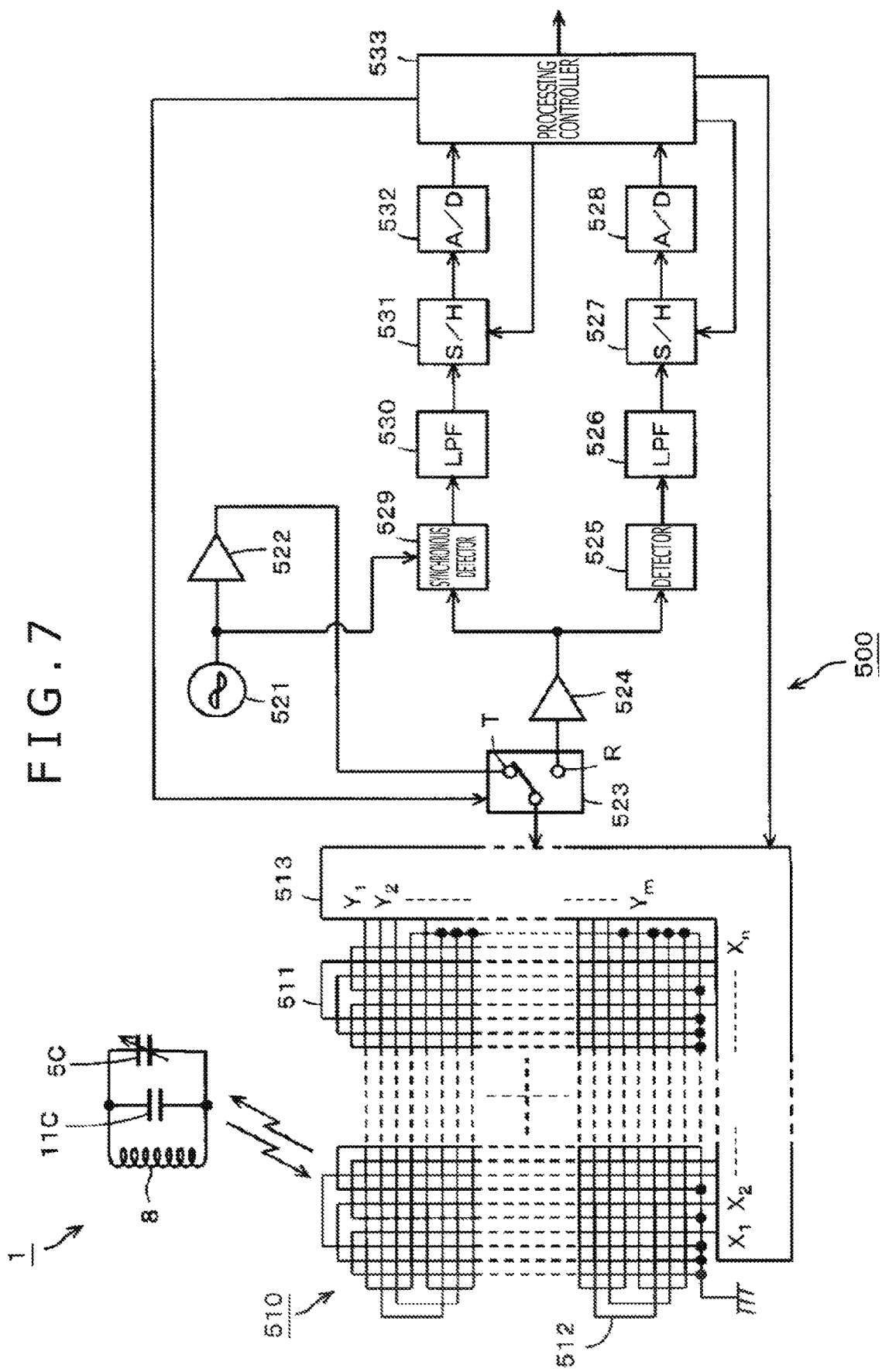
FIG. 7 is a circuit diagram, partly in block form, depicting an electronic circuit arrangement of the stylus depicted in FIG. 1A and an electronic circuit arrangement of a position detecting device used in combination with the stylus.

As depicted in FIG. 7, the electronic pen 1 has a resonant circuit including the coil 8 wound around the ferrite core 9, a variable-capacitance capacitor 5C provided by the pen pressure detector 5, and a capacitor 11C disposed on the printed-circuit board 11. The coil 8, the variable-capacitance capacitor 5C, and the capacitor 1C are connected in parallel to each other.

The position detecting device 500 includes a position detecting coil assembly 510 having stacked layers of an X-axis loop coil group 511 and a Y-axis loop coil group 512. The loop coil groups 511 and 512 include n and m respective rectangular loop coils. The loop coils of the loop coil groups 511 and 512 are arranged at equal intervals in successively overlapping relation.

The position detecting device 500 also includes a selecting circuit 513 connected to the X-axis loop coil group 511 and the Y-axis loop coil group 512. The selecting circuit 513 successively selects one at a time of the loop coils of the two loop coil groups 511 and 512.

The position detecting device 500 further includes an oscillator 521, a current driver 522, a switching connection circuit 523, a reception amplifier 524, a detector 525, a low-pass filter 526, a sample and hold circuit 527, an analog to digital (A/D) converting circuit 528, a synchronous detector 529, a low-pass filter 530, a sample and hold circuit 531, an A/D converting circuit 532, and a processing controller 533. The processing controller 533 includes a microcomputer.

The oscillator 521 generates an alternating current (AC) signal having a frequency f0, and supplies the generated AC signal to the current driver 522 and the synchronous detector 529. The current driver 522 converts the AC signal supplied from the oscillator 521 into a current and delivers the current to the switching connection circuit 523. The switching connection circuit 523 is controlled by the processing controller 533 to switch to a connection terminal (a transmission terminal T or a reception terminal R) to which to connect a loop coil selected by the selecting circuit 513. The current driver 522 is connected to the transmission terminal T, and the reception amplifier 524 is connected to the reception terminal R.

A voltage induced across a loop coil selected by the selecting circuit 513 is sent to the reception amplifier 524 via the selecting circuit 513 and the switching connection circuit 523. The reception amplifier 524 amplifies the induced voltage supplied from the loop coil and delivers the amplified voltage to the detector 525 and the synchronous detector 529.

The detector 525 detects the voltage induced across the loop coil, i.e., a received signal, and sends the received signal to the low-pass filter 526. The low-pass filter 526 has a cutoff frequency sufficiently lower than the frequency f0, and converts the output signal from the detector 525 into a DC signal and delivers the DC signal to the sample and hold circuit 527. The sample and hold circuit 527 samples and holds a voltage value at a predetermined timing of the output signal from the low-pass filter 526, or specifically at a predetermined timing during the reception period, and sends the sampled and held voltage value to the A/D converting circuit 528. The A/D converting circuit 528 converts the analog output signal from the sample and hold circuit 527 into a digital signal, and outputs the digital signal to the processing controller 533.

The synchronous detector 529 performs synchronous detection on the output signal from the reception amplifier 524 with the AC signal from the oscillator 521, and sends a signal having a level that depends on the phase difference between the detected signals to the low-pass filter 530. The low-pass filter 530 has a cutoff frequency sufficiently lower than the frequency f0, and converts the output signal from the detector 529 into a DC signal and delivers the DC signal to the sample and hold circuit 531. The sample and hold circuit 531 samples and holds a voltage value at a predetermined timing of the output signal from the low-pass filter 530, and sends the sampled and held voltage value to the A/D converting circuit 532. The A/D converting circuit 532 converts the analog output signal from the sample and hold circuit 531 into a digital signal, and outputs the digital signal to the processing controller 533.

The processing controller 533 controls various components of the position detecting device 500. Specifically, the processing controller 533 controls the selecting circuit 513 to select a loop coil, controls the switching connection circuit 523 to switch to a connection terminal, and controls the sample and hold circuits 527 and 531 to sample and hold signals at predetermined timings. Based on the input signals from the A/D converting circuits 528 and 532, the processing controller 533 transmits radio waves from the X-axis loop coil group 511 and the Y-axis loop coil group 512 over a certain continuous transmission time (continuous transmission period).

A voltage is induced across each of the loop coils of the X-axis loop coil group 511 and the Y-axis loop coil group 512 by a radio wave transmitted (fed back) from the electronic pen 1. The processing processor 533 calculates the coordinate values of positions indicated on X- and Y-axes by the electronic pen 1 on the basis of the level of the voltage value of the voltage induced across each of the loop coils. The processing controller 533 also detects a pen pressure based on the level of a signal depending on the phase difference between transmitted and received radio waves.

In this manner, the position detecting device 500 detects the position of the electronic pen 1 that has approached the position detecting device 500, with the processing controller 533. The position detecting device 500 also obtains information about the pen pressure value of the electronic pen 1 by detecting the phase of the received signal.

[Operation of the Coupling 4 at the Time the Knocking Pusher 6 of the Electronic Pen 1 According to the First Embodiment is Knocked]

Operation of mainly the coupling 4 at the time the knocking pusher 6 of the electronic pen 1 according to the first embodiment is knocked by the user for propelling the writing core 3 from the mechanical pencil refill 3 will be described below.

Figure 8A:
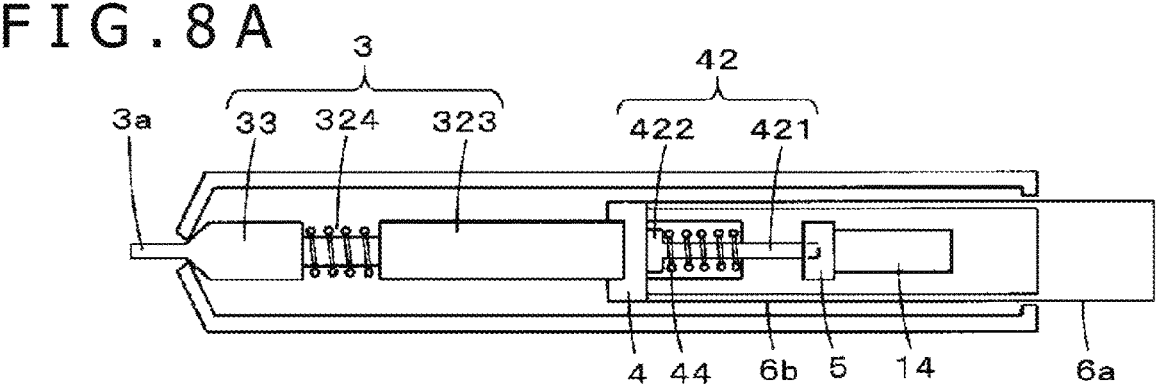
FIGS. 8A, 8B, and 8C are schematic longitudinal cross-sectional views depicting the manner in which the stylus depicted in FIG. 1A operates.
Figure 8B:
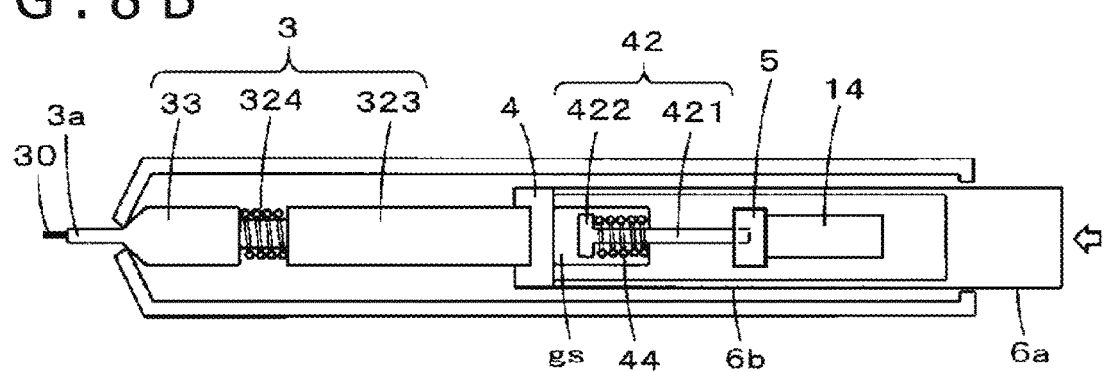
Figure 8C:
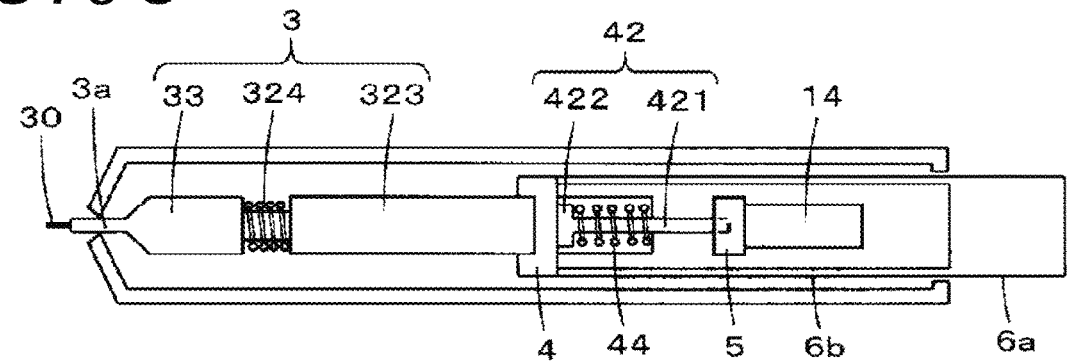
Figure 9A:
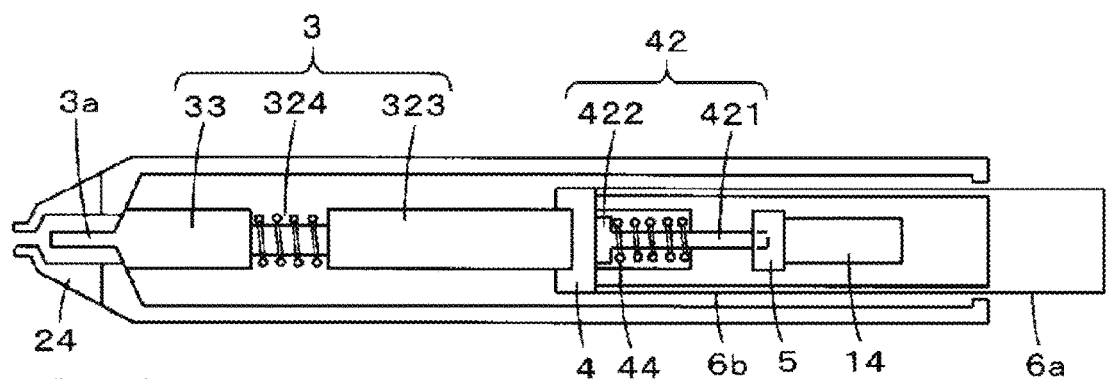
FIGS. 9A, 9B, and 9C are schematic longitudinal cross-sectional views depicting the manner in which the stylus depicted in FIG. 1A operates.
Figure 9B:
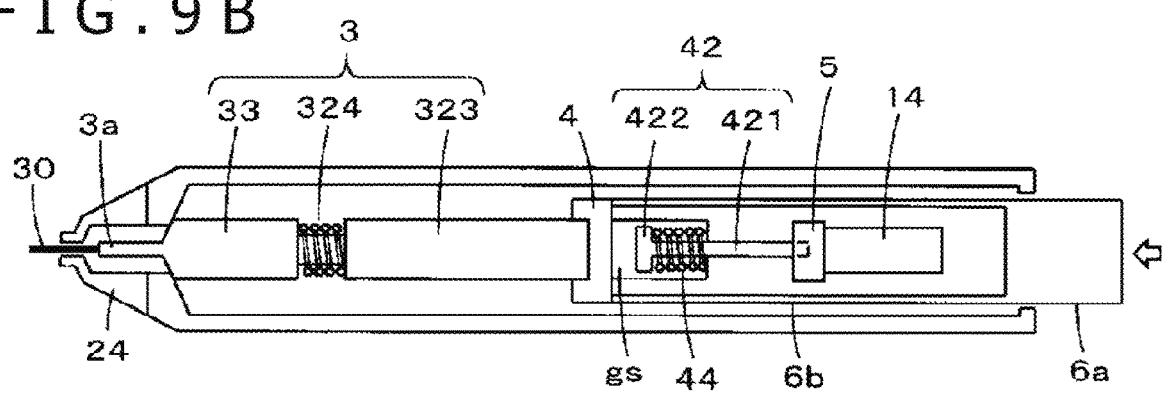
Figure 9C:
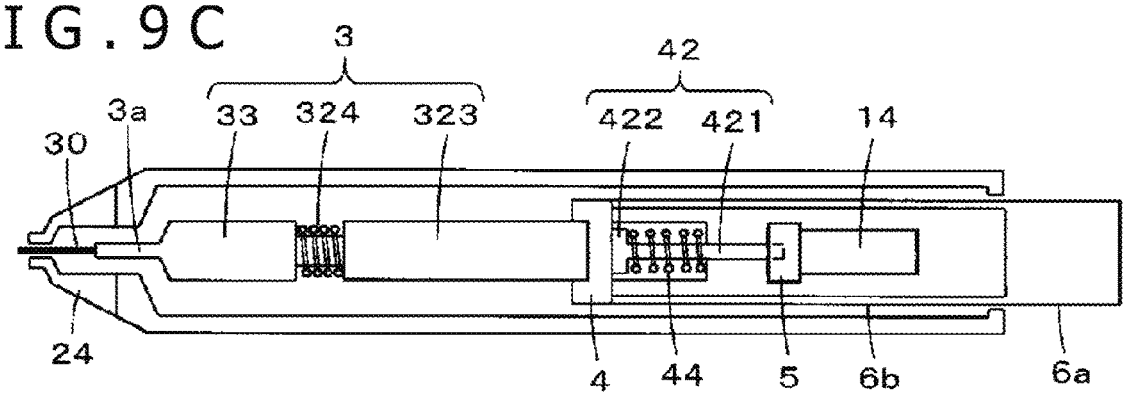

FIGS. 8A, 8B, and 8C schematically depict the manner in which the pen tip 3a of the mechanical pencil refill 3 projects from the pen-tip opening of the casing 2 of the electronic pen 1, with the tip-end cap 24 being omitted from illustration for easy comparison with the electronic pen depicted in FIGS. 12A through 12D. FIGS. 9A, 9B, and 9C schematically depict the manner in which the pen tip 3a of the mechanical pencil refill 3 projects from the pen-tip opening of the casing 2 of the electronic pen 1, with the tip-end cap 24 being illustrated. Operation of the electronic pen 1 will hereinafter be described below with reference to FIGS. 4A, 4B, 8A through 8C, and 9A through 9C.

FIGS. 4A, 8A, and 9A depict the electronic pen 1 in a state in which the knocking protrusion 6a of the knocking pusher 6 is not pushed to propel the writing core 30 from the mechanical pencil refill 3. In this state, the presser 42 has its disk-shaped plate 422 pressed against the bottom of the receptacle 43 by the helical spring 44, biasing the coupling 4 resiliently toward the pen tip 3a.

When the knocking protrusion 6a of the knocking pusher 6 is pushed by the user, as depicted in FIGS. 4B, 8B, and 9B, the coupling 4 slides toward the pen tip 3a, pushing the slide tube 323 of the mechanical pencil refill 3 slidingly with respect to the core housing tube 33, causing the propelling mechanism to propel the writing core 30.

In this state, as depicted in FIGS. 4B, 8B, and 9B, the helical spring 44 between the disk-shaped plate 422 of the presser 42 and the lid 432 of the receptacle 43 is compressed in the receptacle 43, creating a gap gs (see FIG. 9B) between the disk-shaped plate 422 and the bottom of the receptacle 43.

When the user releases the knocking protrusion 6a from the push, the knocking protrusion 6a returns to its original position (FIGS. 4A, 8A, and 9A) under the bias of the helical spring 17. In the receptacle 43, the helical spring 44 resiliently expands from the compressed state, pressing the disk-shaped plate 422 against the bottom of the receptacle 43 to return the coupling 4 resiliently toward the pen tip 3a, thereby eliminating the gap gs.

According to the first embodiment, as depicted in FIGS. 8C and 9C, even though the overall length of the mechanical pencil refill 3 is reduced because the writing core 30 has been propelled, no gap is produced between the bottom of the cylindrical storage space 431 in the receptacle 43 and the disk-shaped plate 422 of the presser 42. Consequently, when the user puts the writing core 30 that projects from the pen tip 3a against a sheet of paper in order to write something thereon, the writing core 30 will not be pushed back into the pen tip 3a.

The overall length of the mechanical pencil refill 3 is not further reduced after the writing core 30 has been propelled and the overall length of the mechanical pencil refill 3 has been reduced. When the knocking protrusion 6a is subsequently pushed by the user and then released, the electronic pen 1 is brought into the state depicted in FIGS. 8C and 9C. Therefore, even if a pressure acts on the tip end of the writing core 30, the mechanical pencil refill 3 will not be pushed back.

According to the first embodiment, when the overall length of the mechanical pencil refill 3 is reduced as the writing core 30 has been propelled, even if the mechanical pencil refill 3 is slightly withdrawn rearwardly, since the pen tip 3a of the mechanical pencil refill 3 is covered with the tip-end cap 24, as depicted in FIG. 9C, such a change in the pen tip 3a of the mechanical pencil refill 3 is concealed from external view.

According to the first embodiment, the user does not feel or see that the writing core 30 propelled from the mechanical pencil refill 3 is pushed back when starting to write something on a sheet of paper.

Second Embodiment

In the first embodiment, the present disclosure is applied to the electronic pen 1 of the electromagnetic induction type. However, the present disclosure is also applicable to an electronic pen of the capacitive coupling type.

An electronic pen of the capacitive coupling type to which the present disclosure is applied is mechanically identical to the electronic pen 1 according to the first embodiment described above except for certain details to be described below.

An electronic pen of the capacitive coupling type according to a second embodiment of the present disclosure includes a mechanical pencil refill made of electrically conductive metal and a signal transmitting circuit mounted on a printed-circuit board. The signal transmitting circuit has an output terminal electrically connected to the mechanical pencil refill, and a signal from the signal transmitting circuit is sent via the mechanical pencil refill to a position detecting device. Information of a pen pressure detected by a pen pressure detecting circuit is included in the signal from the signal transmitting circuit. In the electronic pen of the capacitive coupling type according to the second embodiment, a coil wound around a ferrite core is used to produce a voltage for energizing the signal transmitting circuit.

Figure 10:
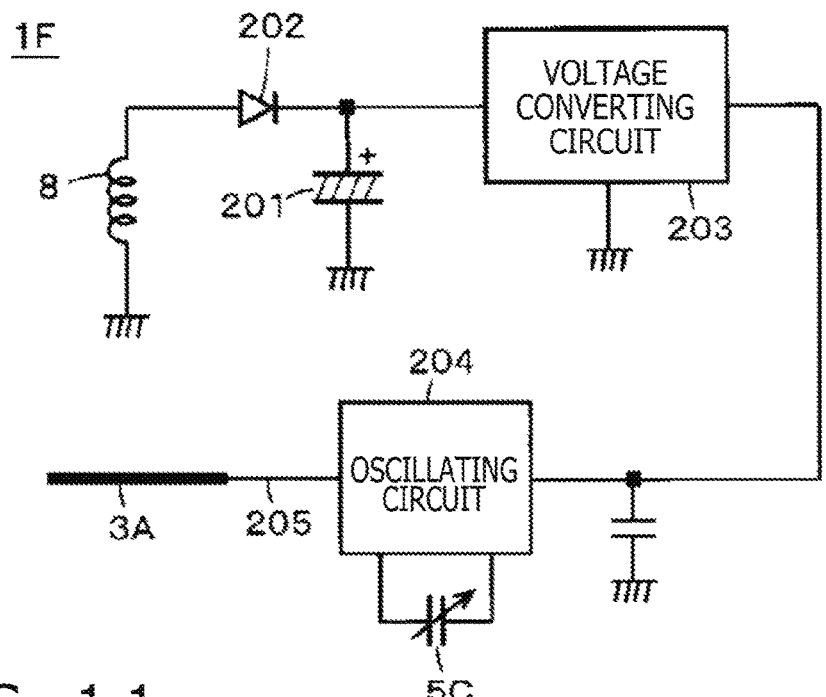
FIG. 10 is a circuit diagram, partly in block form, of depicting an electronic circuit arrangement of a stylus according to a second embodiment of the present disclosure.

FIG. 10 is a circuit diagram, partly in block form, of depicting an electronic circuit arrangement of a stylus or an electronic pen 1A according to the second embodiment.

As depicted in FIG. 10, the electronic pen 1A includes a coil 8, an electric double layer capacitor 201, a rectifying diode 202, a voltage converting circuit 203, and an oscillating circuit 204 serving as a signal transmitting circuit. As depicted in FIG. 10, the coil 8 has an end connected to the anode of the rectifying diode 202 and the other end connected to ground. The electric double layer capacitor 201 has an end connected to the cathode of the rectifying diode 202 and the other end connected to ground.

The electronic pen 1A also includes a mechanical pencil refill 3A made of electrically conductive metal that is electrically connected to the oscillating circuit 204, which is mounted on a circuit board, through a connection line 205. The oscillating circuit 204 generates a signal whose frequency varies depending on the capacitance of the variable-capacitance capacitor 5C provided by the pen pressure detector 5, and supplies the generated signal via the connection line 205 to the mechanical pencil refill 3A. The signal from the oscillating circuit 204 is radiated as an electric field based on the signal from the mechanical pencil refill 3A.

The oscillating circuit 204 includes an LC oscillating circuit having a coil and a capacitor for oscillation. A position detecting device for detecting coordinate positions indicated by the electronic pen 1A is capable of determining a pen pressure applied to the pen tip of the mechanical pencil refill 3A from the frequency of a signal from the oscillating circuit 204.

The voltage converting circuit 203 converts a voltage across the electric double layer capacitor 201 into a certain voltage, and supplies the converted voltage as a power supply for the oscillating circuit 204. The voltage converting circuit 203 may be of a step-down type for converting the voltage across the electric double layer capacitor 201 into a lower voltage, or of a step-up type for converting the voltage across the electric double layer capacitor 201 into a higher voltage. Alternatively, the voltage converting circuit 203 may be of a step-up/down type for converting the voltage across the electric double layer capacitor 201 into a lower voltage if it is higher than the certain voltage referred to above, and converting the voltage across the electric double layer capacitor 201 into a higher voltage if it is lower than the certain voltage referred to above.

When the electronic pen 1A is placed on a charger, not depicted, an electromotive force is induced across the coil 8 by an alternating magnetic field generated by the charger, charging the electric double layer capacitor 201 through the diode 202.

When the electronic pen 1A operates normally (when the electric double layer capacitor 201 is not charged), since the coil 8 is kept at a fixed potential (ground potential in this example), the coil 8 acts as a shield electrode around the mechanical pencil refill 3A. The fixed potential of the coil 8 at the time the electronic pen 1A operates normally is not limited to the ground potential, but may be a positive potential of the power supply or a potential intermediate between the positive potential and the ground potential.

Figure 11:
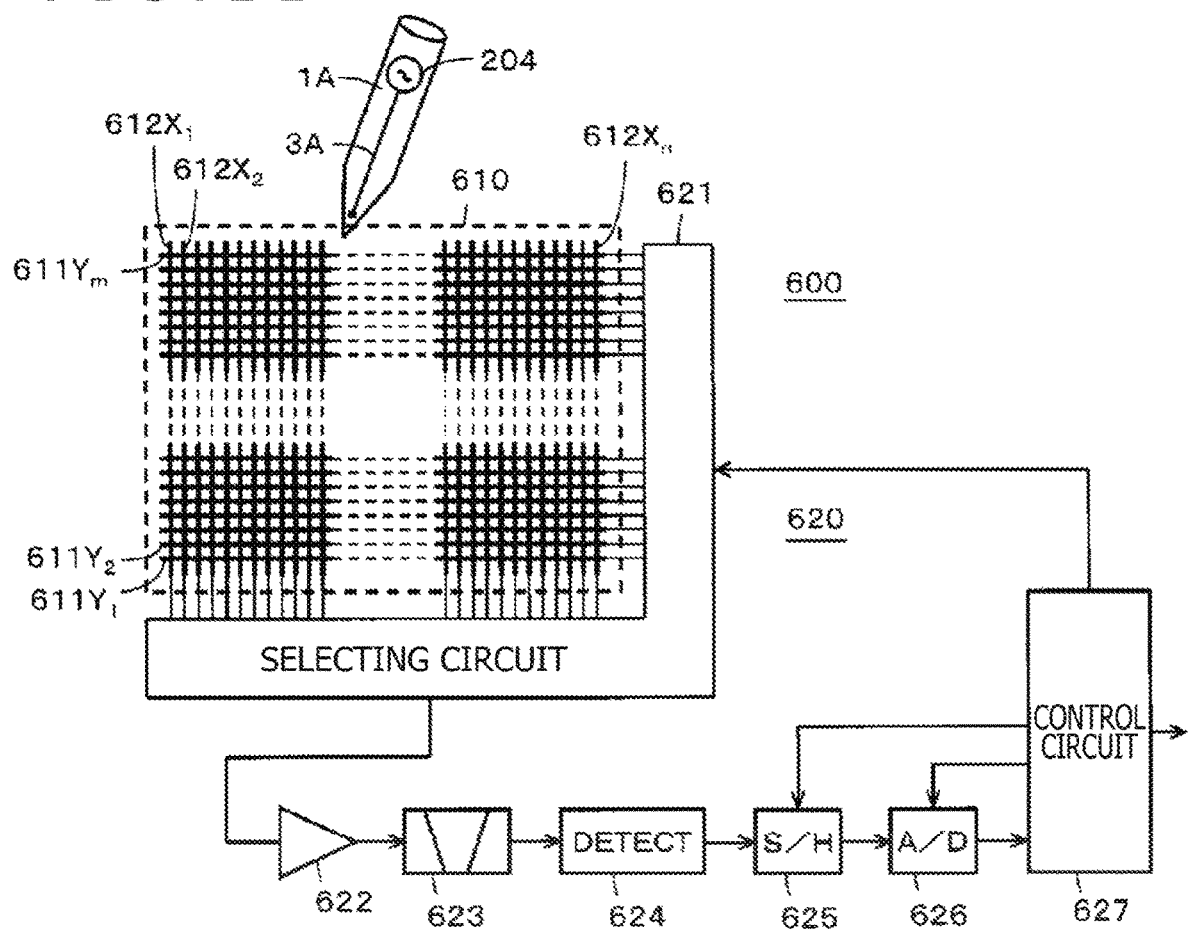
FIG. 11 is a circuit diagram, partly in block form, of depicting an electronic circuit arrangement of a position detecting device used in combination with the stylus depicted in FIG. 10.
Figure 12A:
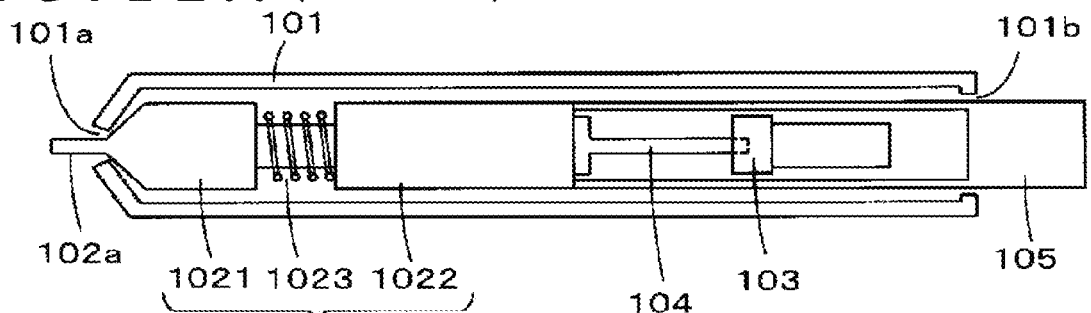
FIGS. 12A, 12B, 12C, and 12D are schematic longitudinal cross-sectional views of a conventional stylus in which a mechanical pencil refill is used as a core body, illustrating problems of the conventional stylus.
Figure 12B:
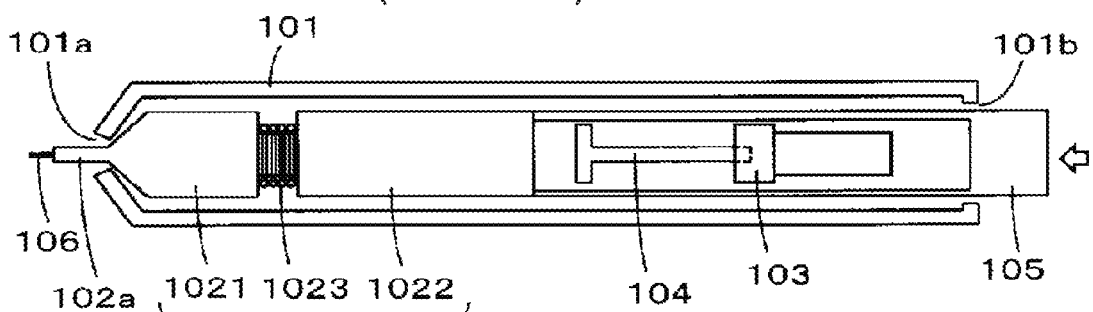
Figure 12C:
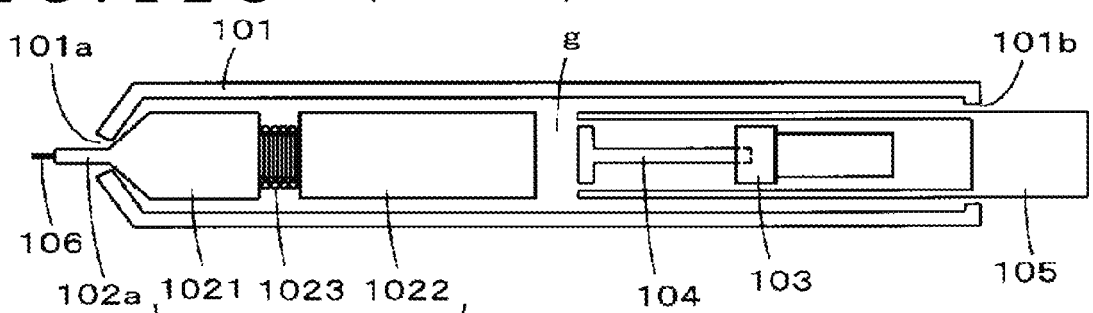
Figure 12D:
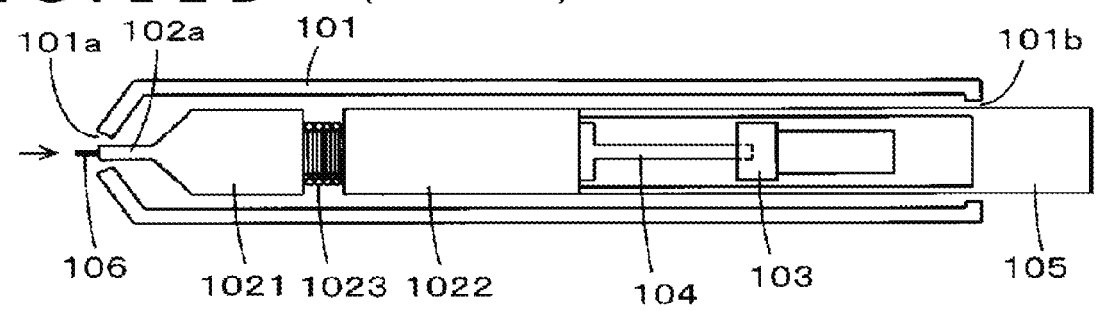

FIG. 11 is a circuit diagram, partly in block form, of depicting an electronic circuit arrangement of a position detecting device 600 that detects the position of the electronic pen 1A on a sensor thereof and also detected a pen pressure applied to the electronic pen 1A in response to a signal from the electronic pen 1A.

As depicted in FIG. 11, the position detecting device 600 includes a sensor 610 and a pen detecting circuit 620 electrically connected to the sensor 610. The sensor 610 includes stacked layers of a first conductor group 611, an insulating layer (not depicted), and a second conductor layer 612 that are successively stacked from below in the order named. The first conductor group 611 includes a plurality of first conductors $611Y_1$, $611Y_2$, . . . , and $611Y_m$ (m is an integer of 1 or greater) extending horizontally (in X-axis directions) and arranged parallel to each other at given spaced intervals in Y-axis directions.

The second conductor group 612 includes a plurality of second conductors $612X_1$, $612X_2$, . . . , and $612X_n$ (n is an integer of 1 or greater) extending in directions perpendicular to the directions along which the first conductors $611Y_1$, $611Y_2$, . . . and $611Y_m$ extend, i.e., vertically (in Y-axis directions) and arranged parallel to each other at given spaced intervals in the X-axis directions.

The sensor 610 of the position detecting device 600 thus has a sensor pattern made up of the first conductor group 611 and the second conductor group 612 that extend across each other, for detecting positions indicated by the electronic pen 1A.

The first conductors $611Y_1$, $611_2$, . . . , and $611Y_m$ will hereinafter be referred to as "first conductors 611Y" if they do not need to be distinguished from each other. Similarly, the second conductors $612X_1$, $612X_2$, . . . , and $612X_n$ will hereinafter be referred to as "second conductors 612X" if they do not need to be distinguished from each other.

The pen detecting circuit 620 includes a selecting circuit 621 serving as an input/output interface connected to the sensor 610, an amplifying circuit 622, a bandpass filter 623, a detecting circuit 624, a sample and hold circuit 625, an A/D converting circuit 626, and a control circuit 627.

The selecting circuit 621 selects one conductor 611Y or conductor 612X from the first conductor group 611 and the second conductor group 612 on the basis of a control signal from the control circuit 627. The conductor selected by the selecting circuit 621 is connected to the amplifying circuit 622, and a signal from the electronic pen 1A is detected by the selected conductor and amplified by the amplifying circuit 622. The amplifying circuit 622 supplies an amplified output signal to the bandpass filter 623, which extracts only a frequency component of the signal sent from the electronic pen 1A.

An output signal from the bandpass filter 623 is detected by the detecting circuit 624, which supplies an output signal to the sample and hold circuit 625. The supplied signal is sampled and held by the sample and hold circuit 625 at a predetermined timing in response to a sampling signal from the control circuit 627, and the sampled and held signal is converted into a digital value by the A/D converting circuit 626. The digital data from the A/D converting circuit 626 are read and processed by the control circuit 627.

The control circuit 627 operates according to a program stored in an internal ROM thereof to send control signals to the sample and hold circuit 625, the A/D converting circuit 626, and the selecting circuit 621. The control circuit 627 calculates coordinate positions indicated by the electronic pen 1A on the sensor 610 from the digital data from the A/D converting circuit 626, and detects a pen pressure detected by the pen pressure detector 5.

Specifically, the control circuit 627 supplies the selecting circuit 621 with selecting signals for successively selecting the second conductors $612X_1$, $612X_2$, . . . , and $612X_n$, and reads data output from the A/D converting circuit 626 as signal levels when the second conductors $612X_1$, $612X_2$, . . . , and $612X_n$, are selected. If all of the signal levels of the second conductors $612X_1$, $612X_2$, . . . , and $612X_n$, do not reach a predetermined value, then the control circuit 627 decides that the electronic pen 1A is not placed on the sensor 610. Then, the control circuit 627b repeats its control process of successively selecting the second conductors $612X_1$, $612X_2$, . . . , and $612X_n$.

If a signal having a level equal to or higher than the predetermined value is detected from any of the second conductors $612X_1$, $612X_2$, . . . , and $612X_n$, then the control circuit 627 stores the number of the second conductor 612X from which the highest signal level is detected and also the numbers of plural second conductors 612X that are present in the periphery of that second conductor 612X. Then, the control circuit 627 controls the selecting circuit 621 to successively select the first conductors $611Y_1$, $611Y_2$, . . . , and $611Y_m$ and reads signal levels from the A/D converting circuit 626. At this time, the control circuit 627 stores the number of the first conductor 611Y from which the highest signal level is detected and also the numbers of plural first conductors 611Y that are present in the periphery of that first conductor 611Y.

Then, the control circuit 627 detects a position indicated by the electronic pen 1A on the sensor 610 from the numbers of the second conductor 612X and the first conductor 611Y from which the highest signal levels are detected and the numbers of the second conductors 612X and the first conductors 611Y that are present in the periphery of those second and first conductors 612X and 611Y.

The control circuit 627 also detects the frequency of the signal from the A/D converting circuit 626 and detects a pen pressure detected by the pen pressure detector 5 of the electronic pen 1A from the detected frequency. Specifically, as described above, the oscillation frequency from the oscillating circuit 204 of the electronic pen 1A depends on the capacitance of the variable-capacitance capacitor 5C. The control circuit 627 has an association table where oscillation frequencies from the oscillating circuit 204 and pen pressure values are associated with each other. The control circuit 627 detects a pen pressure value from the association table.

In the electronic pen 1A according to the above second embodiment, the pen pressure detected by the pen pressure detector 5 is converted into a frequency that is supplied to the mechanical pencil refill 3A. However, a signal attribute to which a pen pressure is associated is not limited to a frequency, but may be a signal phase, the number of times that a signal is intermittently generated, or the like. The signal transmitting circuit may not transmit the oscillation signal from the oscillating circuit, but may transmit a signal produced by processing the oscillation signal, e.g., by modulating the oscillating signal.

In the second embodiment, the signal from the signal transmitting circuit is delivered via the mechanical pencil refill 3A made of electrically conductive metal. However, the tip-end cap 24 on the pen tip of the pen tip sleeve 23 may be made of electrically conductive metal and electrically connected to the signal transmitting circuit, so that the signal from the signal transmitting circuit may be delivered via the tip-end cap 24. Further alternatively, the signal from the signal transmitting circuit may be delivered via both the tip-end cap 24 and the mechanical pencil refill 3A.

Other Embodiments and Modifications

In the above embodiments, the information of the pen pressure is delivered together with the position detecting signal from the signal transmitting circuit. However, a wireless transmitter according to the Bluetooth (registered trademark) standards, for example, may be provided on a circuit mount of a circuit board, and the information of the pen pressure may be sent from the wireless transmitter to the position detecting device separately from the position detecting signal.

In the electronic pen according to the above embodiments, a core body is a mechanical pencil refill provided with a propelling mechanism for propelling a writing core. However, the core body is not limited to a mechanical pencil refill, but may be a ball-point pen refill whose pen tip can be extended when the ball-point pen refill is knocked or pushed, for example.

In the pen pressure detector according to the above embodiments, a dielectric member is sandwiched between two electrodes. However, a pen pressure detector may be a pressure-sensitive chip including a variable-capacitance capacitor constructed as a semiconductor device that is fabricated by the MEMS technology, the pressure-sensitive chip being encapsulated in a package in the form of a cube or rectangular parallelepiped, for example.

In the above embodiments, the pen pressure detector employs a variable-capacitance capacitor whose capacitance is variable depending on a pen pressure. However, a pen pressure detector may employ an inductor or resistor whose inductance or resistance value is variable insofar as it serves as an element for varying the resonant frequency of a resonant circuit.

In the above embodiments, the knocking protrusion 6a of the knocking pusher 6 which is illustrated as an example of a core pressing controller projects from the rear end of the casing 2 of the electronic pen 1 for receiving an axial knocking action. However, a knocking protrusion may be provided as projecting laterally from a side peripheral surface of the casing 2 for receiving a knocking action perpendicular to the central axis of the casing 2, and a member may be provided for converting a force received by the knocking protrusion perpendicularly to the central axis into an axial force and transmitting the axial force to the push bearers 45a and 45b of the coupling 4.

In the above embodiments, the principles of the present disclosure are applied to an electronic pen used in combination with a position detecting device. However, the present disclosure is also applicable to a stylus that is not used in combination with a position detecting device, but serves as a writing instrument having a function as a mechanical pencil or a ball-point pen and provided with a pen pressure detector.

Although the preferred embodiments have been described in detail above, it should be understood that various changes and modifications may be made therein without departing from the scope of the appended claims.

What is claimed is:
1. A stylus comprising:
a tubular casing having an opening;
a core body housed in the tubular casing, a first portion of the core body projecting from the opening of the tubular casing;
a pressure detector housed in the tubular casing, wherein the pressure detector, in operation, detects a pressure applied to the core body;

a coupling connected to a second portion of the core body, the second portion being opposite to the first portion of the core body, wherein the coupling, in operation, transmits the pressure to the pressure detector; and a core pressing controller which, in operation, controls, in response to a user operation, the coupling to selectively press the second portion of the core body into a pressed state in which the core body is displaced toward the opening and releases the core body from the pressed state, wherein the coupling includes:
  a fitting region connected to the second portion of the core body,
  a presser located on a first side of the coupling that is opposite to a second side of the core body on which the fitting region is located, a first end of the presser connected to the pressure detector,
  a receptacle located on the first side of the coupling, a second end of the presser that is opposite to the first end of the presser being movably housed in the receptacle,
  an elastic member disposed in the receptacle, the elastic member biasing the second end of the presser resiliently toward the opening of the tubular casing, and
  a push bearer which, in operation, hears a push, at the first side of the coupling, from the core pressing controller, the core pressing controller housing the presser and the receptacle.

2. The stylus according to claim 1, wherein:
the presser has a flange disposed on the other end thereof, the flange extending perpendicularly to a central axis thereof;
the receptacle has a portion disposed in a vicinity of the pressure detector and is closed by a lid having a through hole defined therein, the axial end of the presser being inserted through the through hole; and
the elastic member is disposed between the flange and the lid.

3. The stylus according to claim 2, wherein the elastic member is a helical spring.

4. The stylus according to claim 1, wherein the core pressing controller, in operation, pushes the push bearer of the coupling toward the axial opening without applying a pressure to the pressure detector.

5. The stylus according to claim 1, further comprising:
a knocking pusher that is knocked by the user operation, wherein the core pressing controller controls the coupling when the knocking pusher is knocked.

6. The stylus according to claim 1, wherein the core body has a mechanical pencil mechanism including a propelling mechanism that propels a writing core in response to the user operation.

7. The stylus according to claim 6, further comprising:
a pen tip member formed of metal disposed over the axial opening defined in the tubular casing,
wherein the writing core propelled from a pen tip of the mechanical pencil mechanism by the propelling mechanism is inserted through and projects from the pen tip member.

8. The stylus according to claim 1, wherein:
the tubular casing includes a tubular inner casing;
the core body is axially movably housed in the tubular inner casing, while the portion of the core body remote from the axial opening projects from the tubular inner casing; and
the stylus further includes a second elastic member disposed between the tubular inner casing and the coupling, the second elastic member biasing the tubular inner casing and the coupling resiliently away from each other.

9. The stylus according to claim 1, wherein:
the pressure detector includes:
  a conductive member having a portion fitted over the presser of the coupling,
  a dielectric member held against a portion of the conductive member remote from the portion of the conductive member which is fitted over the presser, and
  a terminal member, the dielectric member being sandwiched between the terminal member and the conductive member; and
the conductive member and the terminal member which sandwich the dielectric member therebetween make up a capacitor having a capacitance, and the pressure is detected as a change in the capacitance of the capacitor upon a change in an area of contact between the dielectric member and the conductive member depending on a pressure applied through the presser.

10. The stylus according to claim 1, wherein the pressure detector has a packaged component including a pressure-sensitive chip as a micro electro mechanical system whose capacitance is variable depending on a pressure applied through the presser.

11. The stylus according to claim 1, further comprising:
a magnetic core with a coil wound therearound, the magnetic core being disposed in the axial opening defined in the tubular casing, the magnetic core having an axial through hole defined therein,
wherein the core body has a portion disposed in a vicinity of the axial opening and extending through the axial through hole defined in the magnetic core.

12. The stylus according to claim 11, further comprising:
a resonant circuit which, in operation, sends signals to and receives signals from a position detecting sensor, the resonant circuit including a capacitor connected parallel to the coil.

13. The stylus according to claim 1, further comprising:
a conductor disposed at the axial opening defined in the tubular casing and a signal transmitting circuit disposed in the tubular casing,
wherein a signal from the signal transmitting circuit is delivered out of the stylus through the conductor.

14. The stylus according to claim 13, wherein the core body includes the conductor and the core body delivers the signal from the signal transmitting circuit out of the stylus.

* * * * *